May 24, 1966     F. A. WENTWORTH     3,253,212
FERRO-RESONANT CONTROL ELEMENTS AND VARIABLE VOLTAGE POWER
SOURCE INCORPORATING SAME
Filed Oct. 15, 1962

FIG. 1

FIG. 2

United States Patent Office 3,253,212
Patented May 24, 1966

3,253,212
FERRO-RESONANT CONTROL ELEMENTS AND VARIABLE VOLTAGE POWER SOURCE INCORPORATING SAME
Fitzwilliam Allan Wentworth, Mosman, New South Wales, Australia, assignor to Stabilac Pty. Limited, New South Wales, Australia, a corporation of New South Wales
Filed Oct. 15, 1962, Ser. No. 230,441
Claims priority, application Australia, Oct. 24, 1961, 10,582/61
5 Claims. (Cl. 323—56)

This invention relates to variable voltage power supplies. The voltage output may be varied by a manual control, or automatically to provide a voltage regulated output which follows a desired law.

Until recently all commercially available voltage stabilizers and regulators using magnetic amplifier elements used elements basically designed for load current control, and suffered from certain disadvantages inherent in their design. These disadvantages, which are shared by most so-called electronic types of voltages stabilizers or regulators which use electronic amplifiers in a closed feedback loop and a saturable reactor as the power controlling element, are (1) Sudden line voltage changes or load changes cause relatively large fluctuations of the output voltage;

(2) The relatively slow response time of the saturable reactor limits the speed at which these fluctuations are corrected;

(3) Line voltage transients are accentuated;

(4) Special means must be adopted to allow control for light loads or open circuit; and (5) Certain component failures in the closed feedback loop causing a loss of control result in very high overvoltage at the output.

More recently new types of voltages stabilizers and regulators have become available which have made use of magnetic amplifier circuitry designed to have inherent constant voltage characteristics. These new types have greatly improved performance which eliminates most of the disadvantages listed as applying to previous circuitry. However, they themselves have unfavourable characteristics in that expensive core materials are essential, at least two rectifiers are used which must handle a current considerably higher than the load current, and output voltage for the uncontrolled condition is low so that an open loop control system requires a source of bias to shift the operating point through the full control range. Also an extra transformer must be used if it is desired to electrically isolate input and output circuits or to provide voltage transformation (as for a D.C. supply), or alternatively extra commutating rectifiers are necessary when an A.C. output voltage is required.

The present invention enables a voltage regulator or stabilizer to be made in which, for single phase operation (1) Inexpensive core materials are satisfactory; the use of low cost silicon steel laminations provides very high control sensitivity and linearity is adequate for voltage stabilizers with a reasonable adjustment range.

(2) The arrangement may be designed simultaneously as a transformer providing electrical isolation between input and output circuits and any voltage ratio required if this is desired.

(3) Only one rectifier is required and it handles feedback power only.

(4) The control requirements are flexible and current control may be effected by D.C., A.C., half-wave A.C., double frequency A.C. or a combination of any of these: alternatively control may be achieved by a voltage in series with the feedback rectifier, or by the use of a controlled silicon rectifier for this component.

(5) The size of the reguating element for a given permissable temeprature rise is approximately 30% smaller than that of the equivalent component of the prior art regulators using shunt connected magnetic elements.

(6) Output voltage for the uncontrolled state is high— a simplifying requirment in the design of open loop systems provided with compensating circuits.

The invention utilizes as a regulating element and iron-cored reactor having even-harmonic feedback, and preferably this is connected as a ferro-resonant element.

It is an object of this invention to provide a variable voltage power supply source comprising an iron-cored regulating element having a main winding or windings connected in series with a current limiting element, an even-harmonic feedback winding or windings on the core of the regulating element, and a control winding or windings on the said core, the output being taken in parallel with the whole or part of the main winding or windings.

Alternatively the output may be taken from a secondary winding on the core.

In the preferred arrangement the main windings are inter-connected to operate additionally as the feedback winding and are connected in parallel with a capacitor to form a ferro-resonant element.

Reference will now be made to the accompanying drawings in which

FIGURE 1 shows diagrammatically a power supply source which provides an A.C. output, and FIGURE 2 is a schematic circuit diagram of FIGURE 1.

FIGURE 1 shows a power supply source adapted to provide an A.C. output employing a regulating element having windings on a three-limbed iron core. An A.C. power source is connected to the input terminals 1, 2 to provide current through a current-limiting element choke 13 and a main or primary winding 7 comprising four similar sections or windings 7A, 7B, 7C, 7D distributed on the outer limbs of the core. The magnetic flux required to support the primary voltage is divided equally in the two magnetic circuits 11A and 11B comprising the center limb and two outside limbs of the core. A secondary winding 8 has induced in it a voltage determined by the turns ratio between primary and secondary turns and the voltage appearing across the primary. The secondary is connected to output terminals 3, 4 across which a load 14 may be connected.

The windings 7A, 7B, 7C, 7D also provide even harmonic feedback. The windings 7A and 7B are on opposite outer limbs of the core and are connected in series. The windings 7C and 7D are also on opposite outer limbs of the magnetic core and are connected in series. The pair of windings 7A, 7B is connected in parallel with the pair of windings 7C, 7D. A half-wave feedback rectifier 12 is connected between the junction of windings 7A and 7B and the junction of windings 7C, 7D, that is, between points of equal potential (with respect to the fundamental frequency component), but provides a path for rectified components of even harmonic components to flow through the series arrangement of windings. A control winding is provided consisting of windings 10A, 10B on the outer limbs of the core which are connected in opposition, and to which a D.C. control current may be supplied.

In this arrangement the windings 7A, 7B and 7C, 7D are in parallel for fundamental A.C. components and in series for the rectified circulating even harmonic current. Since leakage reactance between separate main and feedback windings is eliminated the constant voltage characteristics are sharply defined with this connection and the power gain for control currents is slightly higher than if separate main and feedback windings were used. It is found also that the total ampere turns of copper to be provided in the core window is somewhat less for a given output power.

The even-harmonic feedback is predominantly second harmonic, and it is found that the primary winding voltage/current characteristic obtained shows an approach to constant voltage conditions, that is, as the primary current increases the voltage across it rises rapidly at first and then tends toward a limiting value. The current limiting element 13 prevents excessive current flow. When there is no control current through winding 10A, 10B, that is for zero control, the feedback windings have no effect since the induced voltages of fundamental frequency, and of the odd order harmonics caused by core saturation, cancel, and no current flows through the rectifier 12. The voltage/current characteristic is therefore that of the normal magetising current, and the voltage at the output is a maximum.

If a control current from a high impedance source is now passed through the control windings 10A, 10B the small D.C. magnetic field established in the core by the control current will be in the same direction as the instantaneous A.C. flux in one half of the core but will oppose it in the other half. If the applied A.C. voltage is low the A.C. flux excursions will be confined to the linear part of the core characteristics and no current will flow in the feedback circuit. As the applied A.C. voltage is raised and the flux excursions are carried into the pre-saturated region of non-linear core characteristics, the difference of the instantaneous fluxes linking the two halves of the feedback winding will no longer be zero, and a voltage of even order harmonic frequencies will cause a circulating current through the rectifier. This circulating harmonic current will be small because of its high effective driving point impedance. The high impedance nature of the source of these currents arises from the fact that although the main total flux is fixed by the primary voltage this flux may divide freely in the two separate magnetic paths of the core and may be readily unbalanced. The peak value of the unbalanced flux excursions in the two halves of the core will be nearly equal to the sum of the D.C. control flux and the superposed A.C. flux.

As the applied A.C. voltage is further increased the maximum excursions of the magnetic flux are eventually carried into a saturated region of the core characteristic. The freely unbalanced condition of the fluxes in the two halves of the core is now constrained and the effective driving impedance of the circulating even harmonic current drops sharply. The D.C. current through the rectifier increases in such a direction as to augment the D.C. control current, and the effect is regenerative, resulting in rapid saturation of the core for further increases in applied voltage. As a consequence a set of characteristic curves is obtained for increasing control current which are similar in shape to that for zero control current but flatten off at increasingly lower voltages across the primary. The response is complete within one or two cycles of the supply frequency.

The number of turns on the primary is designed to be such that the supply voltage is rather higher than necessary to saturate the magnetic core. Neglecting losses the primary current will then be the vector sum of the equivalent secondary load referred to the primary and a high magnetising current. The supply voltage will be shared by the voltage drop across the impedance of the current limiting element 13 and the effective primary impedance. The primary impedance and therefore the secondary voltage applied to the load will be a function of the control current.

In general it will be desirable to shunt either the primary 7 or secondary 8 with a capacitor 15 to form a ferro-resonant circuit. This arrangement leads to a substantial improvement in the control range and inherent voltage characteristics, more efficient utilisation of materials, and improved input power factor.

What I claim is:

1. A ferro-resonant control element comprising an iron core having three limbs, a main winding consisting of two pairs of windings, each pair consisting of a winding on one outer limb of the core and a similar winding on the other outer limb of the core, the windings of a pair being connected in series, and the pairs of windings being connected in parallel, a rectifier connected between the junction of the windings of one pair and the junction of the windings of the other pair, a capacitor connected in parallel with the main winding, and at least one control winding on the core.

2. A variable voltage power supply source including a three-limbed iron-cored regulating element, a main winding consisting of two pairs of windings, each pair consisting of a winding on one outer limb of the core and a similar winding on the other outer limb of the core, the windings of a pair being connected in series, and the pairs of windings being connected in parallel, a rectifier connected between the junctions of the windings of one pair and the junction of the windings of the other pair, whereby the windings act as even-harmonic feedback windings, and control windings on the core, and a current limiting element connected in series with the main winding.

3. A variable voltage power supply source including a three-limbed iron-cored regulating element, a main winding consisting of two pairs of windings, each pair consisting of a winding on one outer limb of the core and a similar winding on the other outer limb of the core, the windings of a pair being connected in series, and the pairs of windings being connected in parallel, a rectifier connected between the junctions of the windings of one pair and the junction of the windings of the other pair, whereby the windings act as even-harmonic feedback windings, a secondary and output winding on the central limb of the core, and control windings on the outer limbs of the core, and a choke connected in series with the main winding.

4. A variable voltage power supply source including a three-limbed iron-cored regulating element, a main winding consisting of two pairs of windings, each pair consisting of a winding on one outer limb of the core and a similar winding on the other outer limb of the core, the windings of a pair being connected in series, and the pairs of windings being connected in parallel, a rectifier connected between the junctions of the windings of one pair and the junction of the windings of the other pair whereby the windings act as even-harmonic feedback windings, a secondary and output winding on the central limb of the core, and control windings on the outer limbs of the core, a capacitor connected across the main winding, and a choke connected in series with the main winding.

5. A ferro-resonant control element comprising an iron core providing two magnetic circuits, a main winding on the iron core, the magnetic flux required to support the voltage across the main winding being divided equally in the two magnetic circuits, a capacitor effectively connected in parallel with the main winding, tapping points on the main winding, between which voltages of fundamental frequency cancel, a rectifier connected between the tapping points, whereby the main winding functions as an even-harmonic feedback winding, and a control winding on the core coupled to the two magnetic circuits in such a way that passage of a control current through the control winding unbalances the two magnetic circuits and even-harmonic currents flow through the rectifier.

References Cited by the Examiner
UNITED STATES PATENTS

| | | | |
|---|---|---|---|
| 2,827,565 | 3/1958 | Weil | 323—89 |
| 2,830,256 | 4/1958 | Bale | 323—66 |
| 3,037,160 | 5/1962 | Manteuffel | 323—56 |
| 3,088,065 | 4/1963 | Manteuffel | 323—89 X |
| 3,122,699 | 2/1964 | Schohan | 323—83 |

LLOYD McCOLLUM, *Primary Examiner.*

GEORGE J. BUDOCK, *Examiner.*

W. E. RAY, J. M. THOMSON, *Assistant Examiners.*